United States Patent [19]

Poo

[11] Patent Number: 4,826,248
[45] Date of Patent: May 2, 1989

[54] STRUCTURAL MEMBER AND LAWN FURNITURE CONSTRUCTED THEREFROM

[75] Inventor: Hoo. W. Poo, Taipei, Taiwan

[73] Assignee: Omni Products International, Inc., Fairfield, N.J.

[21] Appl. No.: 114,662

[22] Filed: Oct. 29, 1987

[51] Int. Cl.⁴ .............................................. A47C 1/12
[52] U.S. Cl. ..................... 297/445; 272/85; 297/DIG. 2; 297/463
[58] Field of Search ................ 297/DIG. 2, 445, 463; 403/237, 191, 234, 365, 230; 272/85; 256/66, 19

[56] References Cited

U.S. PATENT DOCUMENTS

| | | | |
|---|---|---|---|
| 2,798,745 | 7/1957 | Nelson | 285/137.1 |
| 4,281,860 | 8/1981 | Streit | 285/137.1 |
| 4,408,758 | 10/1983 | Gurbst | 272/85 |
| 4,662,775 | 5/1987 | Faul | 403/365 |
| 4,674,799 | 6/1987 | Schwartz | 297/DIG. 2 |

Primary Examiner—James T. McCall
Attorney, Agent, or Firm—Lerner, David, Littenberg, Krumholz & Mentlik

[57] ABSTRACT

A structural member adapted for constructing lawn furniture, outdoor gym equipment and the like includes a hollow, rigid outer member provided with a reinforcing coextruded integral inner member. The structural member is fabricated from plastic material, such as polyvinylchloride extrusions, so as to be light-weight, durable, impervious to weather conditions and suitable for mass production techniques. A threaded plug may be inserted within the inner member to facilitate rigid interconnection of the structural members to provide furniture having a rugged and sturdy design.

23 Claims, 2 Drawing Sheets

STRUCTURAL MEMBER AND LAWN FURNITURE CONSTRUCTED THEREFROM

BACKGROUND OF THE INVENTION

The present invention relates in general to structural members and, more specifically, to light-weight, weather-proof structural members adapted for constructing lawn furniture, outdoor gym equipment and the like.

Structural members of light-weight plastic material are known for use in the construction of lawn furniture as exemplified by U.S. Pat. No. 4,674,799. In producing such lawn furniture, it is desirable to select materials which are impervious to the weather such that the furniture will not rot, rust, corrode, etc., which are readily available, and which are suitable for mass production techniques. It is further desirable to construct the lawn furniture of materials such that they may be easily moved and stored. Despite the desire to make the furniture light-weight, it is still necessary to make the furniture as rugged and sturdy as possible, hence, the use of the structural member disclosed in the aforementioned patent so as to balance the trade-offs between competing design engineering criteria.

The known structural member includes a rigid outer plastic member having two spaced-apart web members which divide the hollow interior into three longitudinally-extending chambers. To provide mechanical strength to the outer plastic member, a hollow, cylindrical metal tube is inserted into the middle chamber. The resulting structural member now possesses the requisite corrosion resistance, light-weight characteristics and sufficient mechanical strength to be used in constructing frames for lawn furniture and the like.

Although the known structural member has found utility in the construction of lawn furniture, gym equipment and the like, it is desirable to fabricate such a structural member from a single material, i.e., light-weight plastic, employing a simple extrusion process. Specifically, it is desirable to eliminate the need of incorporating a metal tube within an otherwise all-plastic structural member to provide mechanical strength. In addition, the necessity of securing one structural member to another has required the use of special plug inserts positioned within a chamber to receive a fastener such as a bolt or the like. Such a plug insert, typically of plastic material including a threaded metal insert, is fit into one chamber at the free end of each structural member that requires attaching to another such member or the like. Although the known plug is secured within the chamber by a single external screw, such plug insert can become loose during use of the lawn furniture over its useful life, thereby rendering the lawn furniture unstable at the locations of the structural member's interconnections.

SUMMARY OF THE INVENTION

It is broadly an object of the present invention to provide a structural member adapted for use in the construction of lawn furniture, outdoor gym equipment, and the like, which structural member is formed of light-weight, plastic material, and which overcomes or avoids one or more of the foregoing disadvantages resulting from the use of known structural members employing reinforcing metal tubes, and which meets the specific requirements of such a structural member having improved strength and connectability in the construction of the foregoing items.

Another object of the present invention is to provide a structural member which is economical to manufacture by extrusion and other such forming techniques.

Another object of the present invention is to provide a structural member which is corrosive-resistant, light-weight, and possesses the requisite mechanical strength for use in the construction of lawn furniture, outdoor gym equipment and the like so as to make the same as rugged and sturdy as possible.

In accordance with one embodiment of the present invention, there is provided a structural member constructed of a hollow, rigid, first outer member, a rigid inner member arranged within the interior of the first outer member along the longitudinal length thereof, the inner member including a central body portion and a plurality of ribs securing the body portion in spaced relationship to the interior surface of the first outer member.

In accordance with another embodiment of the present invention, there is provided a chair constructed of a frame including at least one aforementioned structural member forming at least a weight-bearing portion of the chair, and seat means for forming a body-supporting portion of the chair, the seat means carried by and attached to the frame.

BRIEF DESCRIPTION OF THE DRAWINGS

The above description, as well as further objects, features and advantages of the present invention will be more fully understood with reference to the following detailed description of a presently preferred, but nonetheless illustrative, structural member in accordance with the present invention, when taken in conjunction with the accompanying drawings wherein.

DETAILED DESCRIPTION

Figure 1:
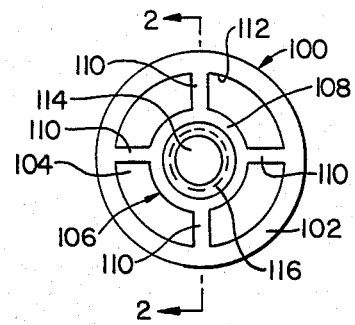
FIG. 1 is a front elevational view of the free end of a structural member constructed in accordance with one embodiment of the present invention.
Figure 2:
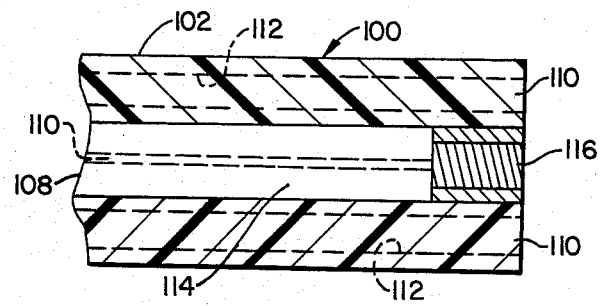
FIG. 2 is a side elevational view of the structural member shown in FIG. 1 taken along line 2—2 therein.

Referring now to the drawings, wherein like reference numerals represent like elements, there is shown in FIGS. 1 and 2 a structural member constructed in accordance with one embodiment of the present invention and designated generally by reference numeral 100. The structural member 100 is formed of a longitudinally-extending hollow, rigid, co-extensive outer member 102 having an interior portion designated generally by reference numeral 104. Secured within the interior portion 104, there is provided a longitudinally-extending, rigid, inner member designated generally by reference numeral 106. The inner member 106 is constructed of a central body portion 108 and a plurality of ribs 110 which secure the body portion in spaced relationship to the interior surface 112 of the outer member 102. In the embodiment of the structural member 100 as thus far described, the body portion 108 is provided with a central opening 114 which receives in secured relationship an internally-threaded metal plug 116, the function of which will be described hereinafter.

The structural member 100, including outer member 102 and body portion 108 are formed of light-weight material, such as plastic material, for example, polyvinylchloride and other such plastic materials. As a result of such materials of construction, the structural member 100 is light-weight, impervious to weather conditions to prevent rotting, rusting and corroding, and is suitable for mass production techniques, such as extrusion and the like. The use of extrusion techniques is considered desirable for mass production, resulting in the fabrication of an integral structural member 100 which is both rugged and sturdy for applications in lawn furniture, outdoor gym equipment and the like. It is also contemplated that the structural member 100 can be constructed of other light-weight and corrosion-resistant materials such as aluminum by similar extrusion and mass production techniques.

Figure 3:
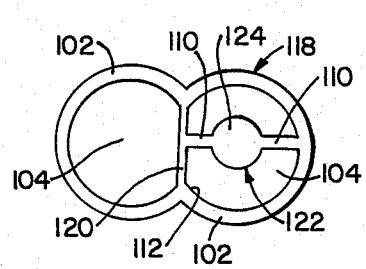
FIG. 3 is a front elevational view of a structural member constructed in accordance with another embodiment of the present invention.

Referring now to FIG. 3, a structural member 118 constructed in accordance with another embodiment of the present invention is shown. The structural member 118 is constructed of a pair of outer members 102 which are longitudinally joined such that their hollow interiors 104 are separated by a web member 120. Within the interior portion 104 of one of the outer members 102, there is provided a coextensive longitudinally-extending inner member 122. The inner member 122 is constructed of a solid central body portion 124 and a plurality of ribs 110 securing the body portion in spaced relationship to the interior surface 112 of the outer member 102. In the FIG. 3 embodiment as thus far described, the body portion 124 is solid as opposed to being hollow in accordance with the body portion 108 as shown in FIG. 1. In addition, there is provided two ribs 110 radially arranged at approximately 180° from each other, as opposed to four ribs radially arranged 90° from each other as shown in the embodiment of FIG. 1. It is to be understood that the inner member 122 may include additional ribs 110 and the body portion 124 may be provided with a hollow interior so as to receive a plug 116 in the manner described with respect to the embodiment of FIG. 1. In any event, the outer members 102 and inner member 122 can be constructed of using similar material and similar mass production techniques as previously described with respect to the embodiment of FIG. 1.

Figure 4:
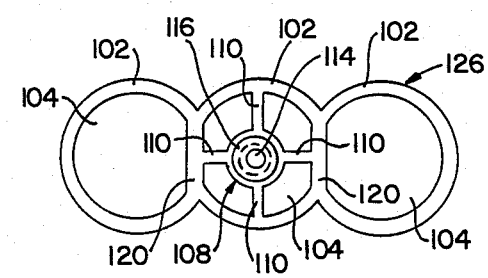
FIG. 4 is a front elevational view of a structural member constructed in accordance with another embodiment of the present invention.

Referring now to FIG. 4, there is disclosed a structural member 126 in accordance with still another embodiment of the present invention. The structural member 126 is constructed of three outer members 102 joined longitudinally to one another in a common plane in the manner as described with respect to the embodiment of FIG. 3. In this regard, the interior portions 104 of each of the outer members 102 are separated from each other by a web member 120. The middle outer member 102 is provided with a coextensive inner member 106 as described with respect to the embodiment of FIG. 1. It is to be understood that the inner member 106 may be constructed in accordance with the construction of the inner member 122 as shown and described with respect to the embodiment of FIG. 3. From the description of the structural members 100, 118, 126, it should be appreciated that numerous modifications and variations of the arrangement of the outer members 102 and inner members 106 are contemplated in accordance with the present invention.

Figure 5:
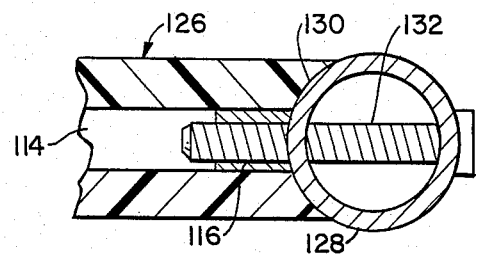
FIG. 5 is a cross-sectional view of a structural member constructed in accordance with any one of the embodiments of the present invention secured to another member in forming a rigid interconnection.

Referring now to FIG. 5, there is shown the attachment in secured relationship of a structural member 126 to a tubular member 128 to provide a rigid interconnection. In this regard, the free end of the structural member 126 is cut to provide a concave end surface 130 having a radius of curvature matching that of the tubular member 128. The tubular member 128 is secured to the structural member 126 by means of a threaded bolt 132 extending transversely through the tubular member 128 and received in threaded engagement within the plug 116. Thus, the plug 116 provides a rugged and sturdy interconnection for the structural member 126 and tubular member 128.

Figure 6:
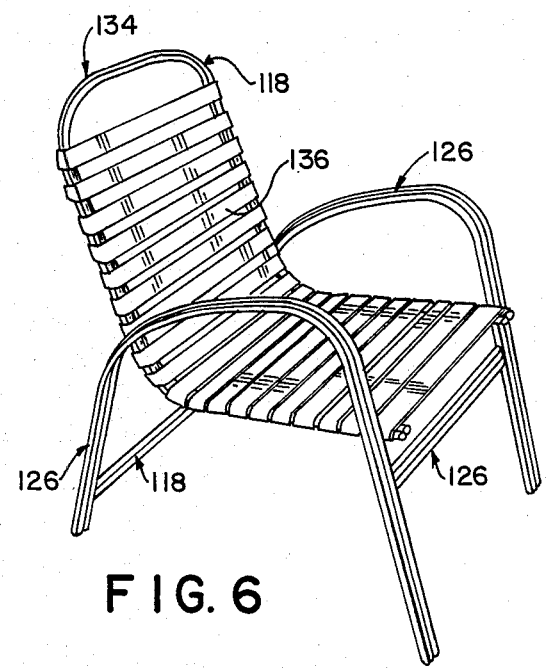
FIG. 6 is a perspective view of a piece of lawn furniture, i.e., a chair, including a frame constructed in part to include a structural member in accordance with any one of the embodiments of the present invention.

Turning now to FIG. 6, there is disclosed the construction of a piece of lawn furniture, namely, a lawn chair 134 utilizing the structural members 118, 126 in accordance with the present invention. However, it is contemplated that the structural members 100, 118, 126 may be utilized in constructing other lawn furniture, outdoor gym equipment and the like. As shown, the chair 134 includes a pair of U-shaped structural members 126 which form the front legs, back legs and arm rests of the chair. The U-shaped structural members 126 are maintained in spaced-apart relationship, in part, by rigid interconnection with linear structural member 126 between their front legs and linear structural member 118 interconnected between their back legs. A U-shaped structural member 118 is bent at an angle to form a backrest and seat portion disposed between the U-shaped structural members 126, and secured thereat by means of, for example, a plurality of bolts 132 in the manner described with respect to FIG. 5. A seating surface and back supporting surface are provided by a plurality of straps 136 extending transverse to the depending legs of the U-shaped structural member 118. A further description of the overall design of the chair 134 may be obtained from the aforementioned patent.

Figure 7:
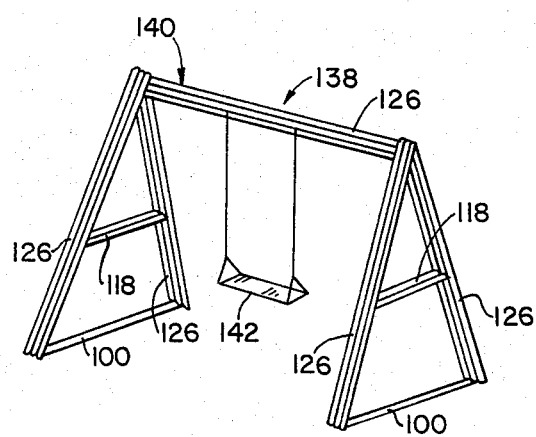
FIG. 7 is a perspective view of outdoor gym equipment, including a frame constructed to include structural member in accordance with any one of the embodiments of the present invention.

Turning now to FIG. 7, there is disclosed the construction of outdoor gym equipment 138 utilizing structural members 100, 118 and 126 in accordance with the present invention. The gym equipment 138 is constructed of a free standing A-frame 140 formed from the rigid interconnection of a plurality of structural members 100, 118 and 126. It is to be understood that the particular arrangement, design and construction of the free standing frame 140 utilizing the structural members 100, 118 and 126 can be modified in accordance with the desires of the user. Secured to the free standing frame 140 is one or more activity devices 142, such as swings, slides, rings, teeter totter, etc.

The embodiments shown and described above are intended to be illustrative and in no way intended as a limitation. It is therefore recognized that numerous modifications of the disclosed embodiments may be made without departing from the scope and content of the present invention as defined by the following claims.

What is claimed is:

1. A structural member comprising a hollow rigid first outer member, a rigid inner member arranged within the interior of said first outer member along the longitudinal length thereof, said inner member including a central body portion and securing means for securing said body portion in spaced relationship to the interior surface of said first outer member, and attaching means arranged within said body portion at one free end thereof for attaching said first member at said one free end to another member of the same or different construction.

2. The structural member of claim 1, wherein said outer member is constructed of plastic material.

3. The structural member of claim 2, wherein said inner member is constructed of plastic material.

4. The structural member of claim 1, wherein said body portion comprises a solid rod.

5. The structural member of claim 1, wherein said securing means comprises a plurality of ribs radially arranged about said body portion at approximately 180° from each other.

6. The structural member of claim 1, wherein said securing means comprises a plurality of ribs radially arranged about said body portion at approximately 90° from each other.

7. The structural member of claim 1, wherein said attaching means comprises an internally threaded portion of said body portion and an externally threaded member extending within said another member and at least partially engaged within said internally threaded portion.

8. The structural member of claim 1, wherein said body portion comprises a hollow rod.

9. The structural member of claim 1, further including a hollow rigid second outer member joined longitudinally to said first outer member, the hollow interiors of said first and second outer member being separated by a first web member.

10. The structural member of claim 9, further including a hollow rigid third outer member joined longitudinally to one of said first or second outer members, the hollow interiors of said first, second and third outer members being separated by said first web member and a second web member.

11. The structural member of claim 10, wherein said first outer member is arranged between said second and third outer members.

12. The structural member of claim 10, wherein said first, second and third outer members and said inner member are constructed of plastic material.

13. The structural member of claim 1, wherein said first outer member and said inner member are integrally formed.

14. A chair comprising a frame including at least one structural member constructed in accordance with claim 1 forming at least a weight-bearing portion of a chair, and seat means for forming a body-supporting portion of a chair, said seat means carried by and attached to said frame.

15. The chair of claim 14, wherein said outer member and said inner member are constructed of plastic material.

16. The chair of claim 14, wherein said attaching means comprises an internally-threaded portion of said body portion and an externally threaded member extending within said another member and at least partially engaged within said internally threaded portion.

17. The chair of claim 14, further including a hollow rigid second outer member joined longitudinally to said first outer member, the hollow interiors of said first and second outer members being separated by a first web member.

18. The chair of claim 17, further including a hollow rigid third outer member joined longitudinally to one of said first or second outer members, the hollow interiors of said first, second and third outer members being separated by said first web member and a second web member.

19. The chair of claim 18, wherein said first, second and third outer members and said inner member are constructed of plastic material.

20. The chair of claim 19, wherein said first, second and third outer members and said inner member are integrally formed.

21. Gym equipment comprising a frame including at least one structural member constructed in accordance with claim 1, and activity means attached to said frame for providing an activity for the user thereof.

22. The structural member of claim 7, wherein said internally threaded portion comprises a plug received within said one free end of said body portion.

23. The structural member of claim 16, wherein said internally threaded portion comprises a plug received within said one free end of said body portion.

* * * * *

REEXAMINATION CERTIFICATE (1503rd)
United States Patent [19]
Poo

[11] B1 4,826,248
[45] Certificate Issued Jul. 2, 1991

[54] STRUCTURAL MEMBER AND LAWN FURNITURE CONSTRUCTED THEREFROM

[75] Inventor: Hoo W. Poo, Taipei, Taiwan

[73] Assignee: OMNI Products International, Inc., Fairfield, N.J.

Reexamination Request:
No. 90/002,181, Oct. 26, 1990

Reexamination Certificate for:
Patent No.: 4,826,248
Issued: May 2, 1989
Appl. No.: 114,662
Filed: Oct. 29, 1987

[51] Int. Cl.⁵ .............................. A47C 5/12
[52] U.S. Cl. ...................... 297/445; 272/85; 297/463; 297/DIG. 2
[58] Field of Search ............... 297/445, 463, DIG. 2; 403/237, 191, 234, 365, 230; 272/85; 256/66, 19

[56] References Cited

U.S. PATENT DOCUMENTS 3,985,460  10/1976  Piper et al.

FOREIGN PATENT DOCUMENTS 1554300  6/1970  Fed. Rep. of Germany.
1477218  6/1977  United Kingdom.

*Primary Examiner*—Peter R. Brown

[57] ABSTRACT

A structural member adapted for constructing lawn furniture, outdoor gym equipment and the like includes a hollow, rigid outer member provided with a reinforcing coextruded integral inner member. The structural member is fabricated from plastic material, such as polyvinylchloride extrusions, so as to be light-weight, durable, impervious to weather conditions and suitable for mass production techniques. A threaded plug may be inserted within the inner member to facilitate rigid interconnection of the structural members to provide furniture having a rugged and sturdy design.

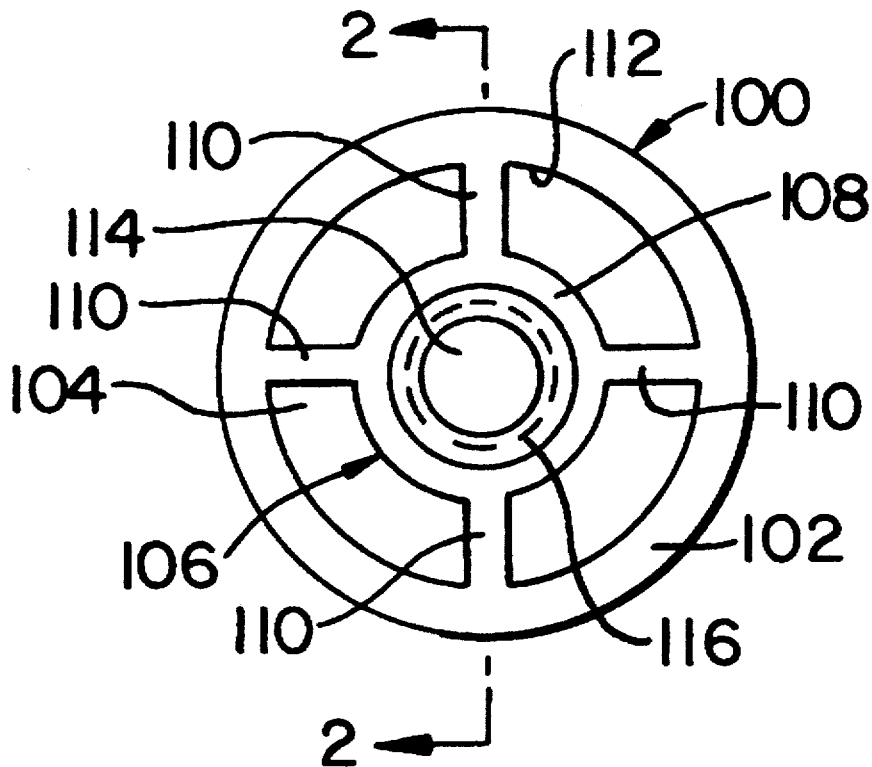

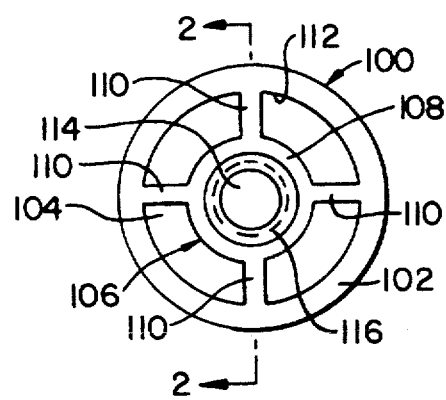

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 3, 7, 15, 16, 22 and 23 are cancelled.

Claim 1 is determined to be patentable as amended.

Claims 4-6, 8-14 and 17-21, dependent on an amended claim, are determined to be patentable.

New claims 24-26 are added and determined to be patentable.

1. A structural member comprising [a] *an extruded hollow rigid first outer member fabricated from plastic material, a co-extruded rigid inner member fabricated from plastic material* arranged within the interior of said first outer member along the longitudinal length thereof, said inner member including a central body portion and securing means for securing said body portion in spaced relationship to the interior surface of said first outer member, and attaching means [arranged] *comprising an internally-threaded metal plug secured within said body portion at one free end thereof to receive a cooperatively threaded bolt* for attaching said first member at said one free end to another member of the same or different construction, *arranged transversely to said first member.*

24. *The structural member of claim 1, wherein said internally-threaded metal plug secured within said body portion is disposed flush with at least an inside surface at one free end of said body portion.*

25. *A structural member comprising a first member including an extruded hollow rigid first outer member fabricated from plastic material, a co-extruded rigid inner member fabricated from plastic material arranged within the interior of said first outer member along the longitudinal length thereof, said inner member including a central body portion and securing means for securing said body portion in spaced relationship to the interior surface of said first outer member, and attaching means comprising an internally-threaded metal plug secured within said body portion at one free end thereof to receive a cooperatively threaded bolt, another member of the same or different construction arranged transversely to said first member, and a threaded bolt arranged transversely through at least a portion of said another member and engaging at least one surface of said another member, said threaded bolt and said metal plug being cooperatively engaged such that said first member and said another member are securely interconnected.*

26. *The structural member of claim 25, wherein said internally-threaded metal plug secured within said body portion is disposed flush with at least an inside surface at one free end of said body portion.*

* * * * *